US010015677B2

(12) United States Patent
Chou (10) Patent No.: US 10,015,677 B2
(45) Date of Patent: *Jul. 3, 2018

(54) COVERAGE ESTIMATION OF WIRELESS CELLULAR NETWORKS BY USER EQUIPMENT (UE) IDLE MODE MEASUREMENTS

(71) Applicant: Intel Corporation, Santa Clara, CA (US)

(72) Inventor: Joey Chou, Scottsdale, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/617,094

(22) Filed: Jun. 8, 2017

(65) Prior Publication Data

US 2017/0280334 A1   Sep. 28, 2017

Related U.S. Application Data

(63) Continuation-in-part of application No. 15/100,571, filed as application No. PCT/US2014/010085 on Jan. 2, 2014, now Pat. No. 9,716,559.

(51) Int. Cl.
*H04W 36/00* (2009.01)
*H04W 16/18* (2009.01)
(Continued)

(52) U.S. Cl.
CPC .......... *H04W 16/18* (2013.01); *H04B 17/318* (2015.01); *H04W 24/10* (2013.01);
(Continued)

(58) Field of Classification Search
CPC ... H04W 84/045; H04W 88/10; H04W 16/14; H04W 72/0453; H04W 74/0808;
(Continued)

(56) References Cited

U.S. PATENT DOCUMENTS 7,113,793 B2   9/2006   Veerasamy et al.
7,450,523 B1 *  11/2008  Robertson ............. H04L 41/082
                                                    370/236
(Continued)

FOREIGN PATENT DOCUMENTS

EP           2676481 A1 *  12/2013  ........ H04W 36/0094
JP         2010-538555 A    12/2010
(Continued)

OTHER PUBLICATIONS

International Search Report and Written Opinion issued in corresponding PCT Application No. PCT/US2014/010085, dated Oct. 6, 2014, 13 pages.

(Continued)

*Primary Examiner* — Mahendra Patel
(74) *Attorney, Agent, or Firm* — Grossman Tucker Perreault & Pfleger, PLLC (57) ABSTRACT

Generally, this disclosure provides devices, systems and methods for improved coverage estimation of wireless cellular networks through User Equipment (UE) idle mode measurement and reporting. A UE may include a signal measurement module to measure a reference signal received power (RSRP) of a serving cell of the UE, the UE in an idle mode, and to determine if the RSRP is below a threshold value. The UE may also include a cell search and selection module to search for a neighbor cell in response to determining that the RSRP is below the threshold value, and to camp on the neighbor cell if the search succeeds. The UE may further include a data logging module to log information associated with the neighbor cell, if the neighbor cell search succeeds and to log information associated with the serving cell, if the neighbor cell search fails.

21 Claims, 6 Drawing Sheets

(51) Int. Cl.
*H04W 48/16* (2009.01)
*H04B 17/318* (2015.01)
*H04W 24/10* (2009.01)
*H04W 76/28* (2018.01)
*H04B 17/327* (2015.01)

(52) U.S. Cl.
CPC ............ *H04W 48/16* (2013.01); *H04W 76/28* (2018.02); *H04B 17/327* (2015.01)

(58) Field of Classification Search
CPC . H04W 72/085; H04W 72/08; H04W 76/048; H04W 24/08; H04W 74/0833; H04W 72/14; H04W 24/02; H04W 24/10; H04W 36/0083; H04W 16/18; H04W 48/16; H04W 76/28; H04J 3/1694; H04L 1/00; H04B 17/318; H04B 17/327
USPC .................. 455/436, 422.1, 552.1, 445, 446; 370/330, 331, 315, 329
See application file for complete search history.

(56) References Cited

U.S. PATENT DOCUMENTS

| | | | |
|---|---|---|---|
| 8,437,764 B2 | 5/2013 | Doettling et al. | |
| 8,868,067 B2 | 10/2014 | Chou et al. | |
| 9,277,469 B2* | 3/2016 | Cucala Garcia | H04W 36/0061 |
| 2010/0118752 A1 | 5/2010 | Suzuki et al. | |
| 2010/0208604 A1 | 8/2010 | Kazmi et al. | |
| 2010/0267378 A1 | 10/2010 | Hamabe et al. | |
| 2010/0279638 A1* | 11/2010 | Lindoff | H04L 25/0204 455/226.1 |
| 2011/0189989 A1* | 8/2011 | Mach | H04W 36/30 455/423 |
| 2011/0211458 A1 | 9/2011 | Ishii et al. | |
| 2011/0319032 A1* | 12/2011 | Pica | H04W 24/10 455/67.13 |
| 2012/0046030 A1* | 2/2012 | Siomina | G01S 5/00 455/423 |
| 2012/0087247 A1 | 4/2012 | Min et al. | |
| 2012/0088457 A1 | 4/2012 | Johansson et al. | |
| 2012/0108232 A1 | 5/2012 | Viering et al. | |
| 2012/0127876 A1* | 5/2012 | Hunukumbure | H04W 24/00 370/252 |
| 2012/0172041 A1 | 7/2012 | Krishnamurthy et al. | |
| 2012/0315890 A1* | 12/2012 | Suzuki | H04W 24/10 455/422.1 |
| 2013/0084842 A1 | 4/2013 | Laitinen et al. | |
| 2013/0188499 A1* | 7/2013 | Mach | H04W 48/20 370/252 |
| 2013/0203420 A1 | 8/2013 | Hapsari et al. | |
| 2013/0223235 A1 | 8/2013 | Hu et al. | |
| 2013/0223307 A1* | 8/2013 | Ohlsson | H04W 52/0216 370/311 |
| 2013/0235738 A1* | 9/2013 | Siomina | H04W 24/00 370/252 |
| 2013/0294281 A1* | 11/2013 | Lee | H04W 24/10 370/252 |
| 2014/0038614 A1 | 2/2014 | Diachina et al. | |
| 2014/0051431 A1 | 2/2014 | Viering et al. | |
| 2014/0080482 A1 | 3/2014 | Yasuoka et al. | |
| 2014/0247810 A1* | 9/2014 | Bontu | H04W 36/0094 370/332 |
| 2014/0357273 A1* | 12/2014 | Teng | H04W 36/32 455/436 |
| 2015/0045014 A1 | 2/2015 | Bodog et al. | |
| 2015/0223094 A1 | 8/2015 | Tomala et al. | |

FOREIGN PATENT DOCUMENTS

| | | |
|---|---|---|
| JP | 2012-044338 A | 3/2012 |
| JP | 2012-114916 A | 6/2012 |
| RU | 2011153700 A | 7/2013 |
| WO | 2009-060935 A1 | 5/2009 |
| WO | 2010125064 A1 | 11/2010 |
| WO | WO 2010125064 A1 * 11/2010 | ......... H04L 25/0204 |
| WO | WO 2011097730 A1 * 8/2011 | ........... H04W 24/10 |
| WO | 2012092060 A1 | 7/2012 |
| WO | WO 2012092060 A1 * 7/2012 | ........... H04J 11/005 |
| WO | 2012-164694 A1 | 12/2012 |
| WO | 2014-018217 A1 | 1/2014 |
| WO | WO 2014045185 A3 * 9/2014 | ........... H04L 5/0048 |

OTHER PUBLICATIONS

International Preliminary Report on Patentability and Written Opinion issued in corresponding PCT Application No. PCT/US2014/010085, dated Jul. 14, 2016, 12 pages.
U.S. Appl. No. 61/707,784, filed Sep. 28, 2012, pp. 1-315.
3GPP TS 25.304, v10.5.0, "User Equipment (UE) procedures in idle mode and procedures for cell reselection in connected mode (Release 10)", Jun. 2012, pp. 1-52.
Taiwan Office Action issued in corresponding Taiwanese Application No. 103141800, dated Jan. 20, 2016, with English translation, 20 pages.
Taiwan IPO Search Report issued in corresponding Taiwanese Application No. 103141800, dated Dec. 22, 2015, with English translation, 3 pages.
3GPP TS 36.331, V11.0.0, Evolved Universal Terrestrial Radio Access (E-UTRA); Radio Resource Control (RRC); Protocol specification (Release 11), Jun. 2012, pp. 1-302.
3GPP TS 36.300, v 11.2.0, Evolved Universal Terrestrial Radio Access (E-UTRA) and Evolved Universal Terrestrial Radio Access Network (E-UTRAN); Overall description; Stage 2 (Release 11), Jun. 2012, pp. 1-201.
Japanese Office Action issued in Japanese Application No. 2016-533699, dated May 22, 2017, with English translation, 6 pages.
Taiwanese Office Action and Search Report issued in Taiwanese Application No. 103141800, dated Mar. 14, 2017, with English translation, 12 pages.
Korean Office Action issued in Korean Application No. 2016-7014627, dated Feb. 20, 2017, with English translation, 10 pages.
Canadian Office Action issued in Canadian Application No. 2,935,102, dated Apr. 28, 2017, 3 pages.
Notice of Allowance issued in U.S. Appl. No. 15/100,571, dated Mar. 10, 2017, 27 pages.
Office Action issued in U.S. Appl. No. 15/100,571, dated Nov. 17, 2016, 25 pages.
Russian Office Action issued in Russian Application No. 2016121930, dated May 19, 2017, with English translation, 14 pages.
3GPP TS 32.522 V11.2.0 (Jun. 2012) 3rd Generation Partnership Project; Technical Specification Group Services and System Aspects; Telecommunication management; Self-Organizing Networks (SON) Policy Network Resource Model (NRM) Integration Reference Point (IRP); Information Service (IS) (Release 11), 35 pages.
3GPP TR 32.836 V1.1.0 (Oct. 2013)3rd Generation Partnership Project; Technical Specification Group Services and System Aspects; Telecommunication management; Study on NM Centralized Coverage and Capacity Optimization (CCO) SON Function (Release 12), 26 pages.
Chen, et al.: "A Secure Relay-Assisted Handover Protocol for Proxy Mobile IPv6 in 3GPP LTE Networks", WCNC010, IEEE, 6 pages.
Ahmed, et al.: "Probabilistic Coverage in Wireless Sensor Networks", 2005, IEEE, 8 pages.
International Search Report and Written Opinion issued in PCT Application No. PCT/US2013/048361, dated Oct. 1, 2013, 9 pages.
International Preliminary Report on Patentability and Written Opinion issued in PCT Application No. PCT/US2013/048361, dated Jan. 27, 2015, 17 pages.
Notice of Allowance issued in U.S. Appl. No. 13/730,266, dated Jul. 2, 2014, 9 pages.
Extended European Search Report issued in European Application No. 14876609.0, dated Jul. 25, 2017, 15 pages.

(56) References Cited

OTHER PUBLICATIONS

3GPP TR 36.805 V9.0.0 (Dec. 2009) 3rd Generation Partnership Project; Technical Specification Group Radio Access Network; Study on Minimization of drive-tests in Next Generation Networks; (Release 9), Dec. 21, 2009, 24 pages.
3GPP TS 25.304 vi0.5.0 (Jun. 2012) 3rd Generation Partnership Project; Technical Specification Group Radio Access Network; User Equipment (UE) procedures in idle mode and procedures for cell reselection in connected mode (Release 10), Jun. 26, 2012, 52 pages.
Taiwanese Office Action and Search Report issued in Taiwanese Application No. 106126092, dated Mar. 30, 2018, with English translation, 10 pages.
English translation of Mexican Office Action issued in Mexican Application No. MX/a/2016/007220, dated Apr. 6, 2018, 2 pages.

\* cited by examiner

COVERAGE ESTIMATION OF WIRELESS CELLULAR NETWORKS BY USER EQUIPMENT (UE) IDLE MODE MEASUREMENTS

CROSS-REFERENCE TO RELATED APPLICATIONS

The present application is a continuation of U.S. patent application Ser. No. 15/100,571, filed May 31, 2016, which is a National Stage Entry of PCT/US2014/010085, filed Jan. 2, 2014, both of which are incorporated herein by reference.

FIELD

The present disclosure relates to coverage estimation of wireless cellular networks, and more particularly, to coverage estimation of wireless cellular networks through User Equipment (UE) idle mode measurement and reporting.

BACKGROUND

The accelerated adoption of smartphones, tablets and cloud computing has resulted in the rapid growth of global mobile data traffic. The adoption of 3GPP Long Term Evolution (LTE) or LTE-Advanced (LTE-A) wireless networks, that offer increased capacity and capability, is an ongoing process. Network providers and operators typically deploy LTE, at least initially, in areas with relatively more dense population in an attempt to mitigate traffic congestion.

Initial LTE deployment and coverage may therefore be variable with discontinuities or gaps in coverage. Underlying legacy radio access networks, for example networks supporting Universal Mobile Telecommunication System (UMTS) and/or Global System for Mobile Communication (GSM), may provide more basic coverage in regions or areas where LTE coverage holes exist. Network operators or providers generally attempt to map their LTE coverage areas for planning purposes associated with the design and implementation of increased LTE coverage, for example the roll out of additional LTE base stations or evolved Node Bs (eNBs). Some existing methods for coverage mapping involve driving a vehicle equipped with test apparatus through a geographic region to collect signal measurements. This process, however, is relatively time consuming and inefficient.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for improved coverage estimation of wireless cellular networks through User Equipment (UE) idle mode measurement and reporting. A UE, which may for example be travelling in a vehicle, is configured to detect LTE coverage holes, which are associated with areas of relatively weak or nonexistant eNB signal reception. Since UEs may typically remain in idle mode for a relatively large percentage of the time that they are powered on, this technique provides an increased window of opportunity for coverage hole detection. A potentially large number of UEs may report their idle mode measurements, along with locations and timestamps, up through the network hierarchy to a network manager where the collected measurements may be stored, analyzed and/or correlated to generate LTE coverage maps with increased efficiency.

Figure 1:
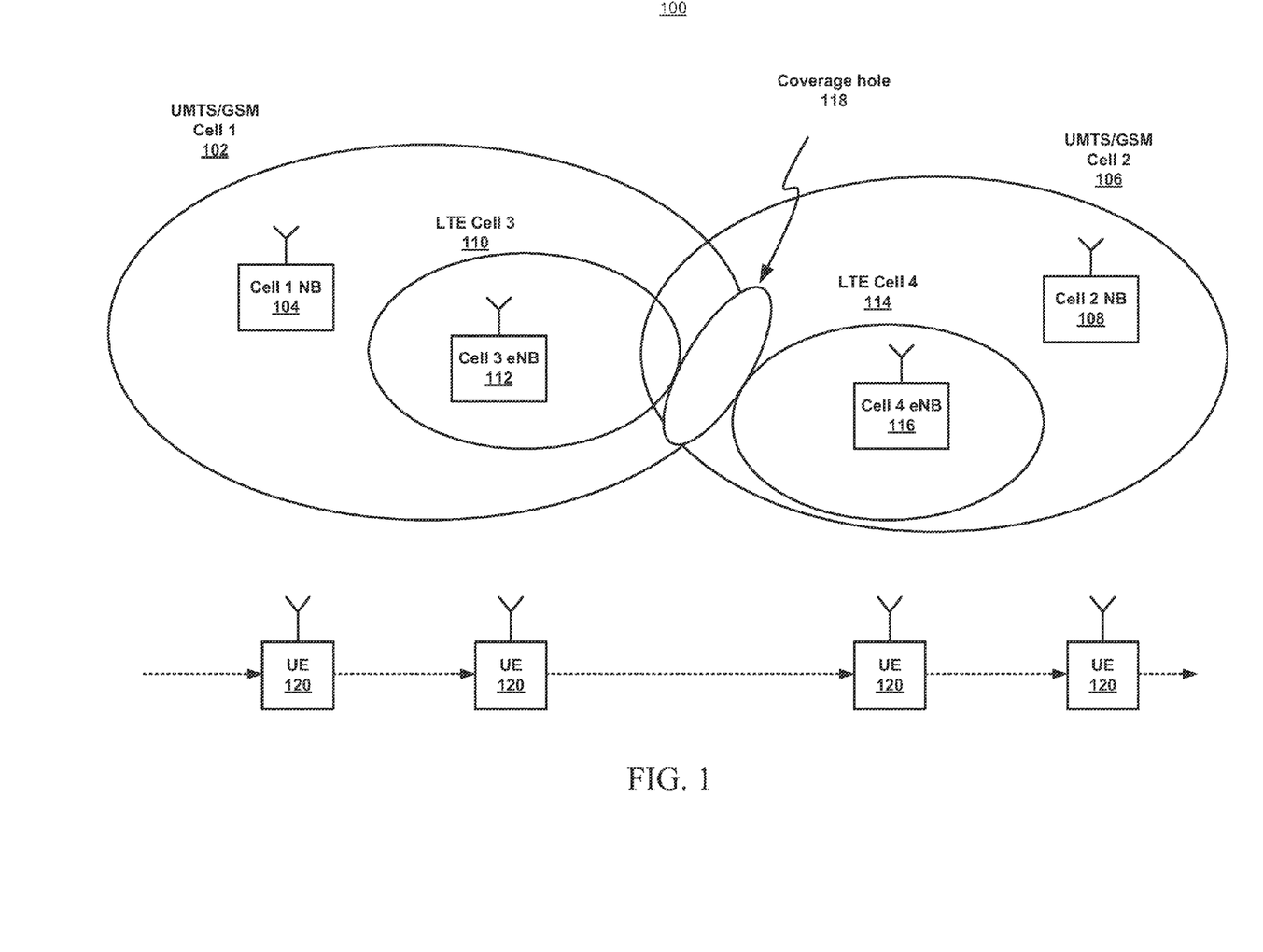
FIG. 1 illustrates a top level diagram of one example embodiment consistent with the present disclosure.

FIG. 1 illustrates a top level diagram 100 of one example embodiment consistent with the present disclosure. A wireless network is shown to include a number of cell base stations, node Bs (NBs) and eNBs, and their associated cell coverage areas. Cell 1 NB 104 provides a UMTS or GSM coverage area 102 and cell 2 NB provides a UMTS or GSM coverage area 106. The UMTS cell may be part of a Universal Terrestrial Radio Access Network (UTRAN). The GSM cell may be part of a GSM Enhanced Data Rates for GSM Evolution (EDGE) Radio Access Network (GERAN). The UMTS and/or GSM cells, representing an older, more established technology, may provide a relatively large underlying coverage area. LTE eNBs 112, 114, and their associated LTE coverage cells 110, 114, may be overlaid onto this UMTS/GSM coverage area. Coverage holes or gaps 118 may exist between LTE cells.

UE 120 may travel within or through the wireless network such that, at various times, it is within proximity for signal reception from cell 1 NB 104, cell 2 NB 108, cell 3 eNB 112 and cell 4 eNB 116. Although UE 120 may be in idle mode, these signals may be received and processed, as will be described in greater detail below, to detect LTE coverage holes.

While this is a simplified example, for illustration purposes, it will be appreciated that in practice any configuration of eNBs, NBs, UEs and cell coverage areas of various types may be deployed and may provide coverage extending to any number or areas, regions or sectors. The wireless network may comply with, or otherwise be compatible with, the Third Generation Partnership Project (3GPP) Long Term Evolution (LTE) and/or LTE-Advanced (LTE-A) based wireless network standard, including current, previous and future versions of that standard. These standards may include, for example, 3GPP TS 25.304, V10.5.0, "User Equipment (UE) procedures in idle mode and procedures for cell reselection in connected mode (Release 10)," 3GPP TS 36.300, V11.2.0, "Evolved Universal Terrestrial Radio Access (E-UTRA) and Evolved Universal Terrestrial Radio Access Network (E-UTRAN); Overall description; Stage 2 (Release 11)," 3GPP TS 36.331, V11.0.0, "Evolved Universal Terrestrial Radio Access (E-UTRA); Radio Resource Control (RRC); Protocol specification (Release 11)."

Figure 2:
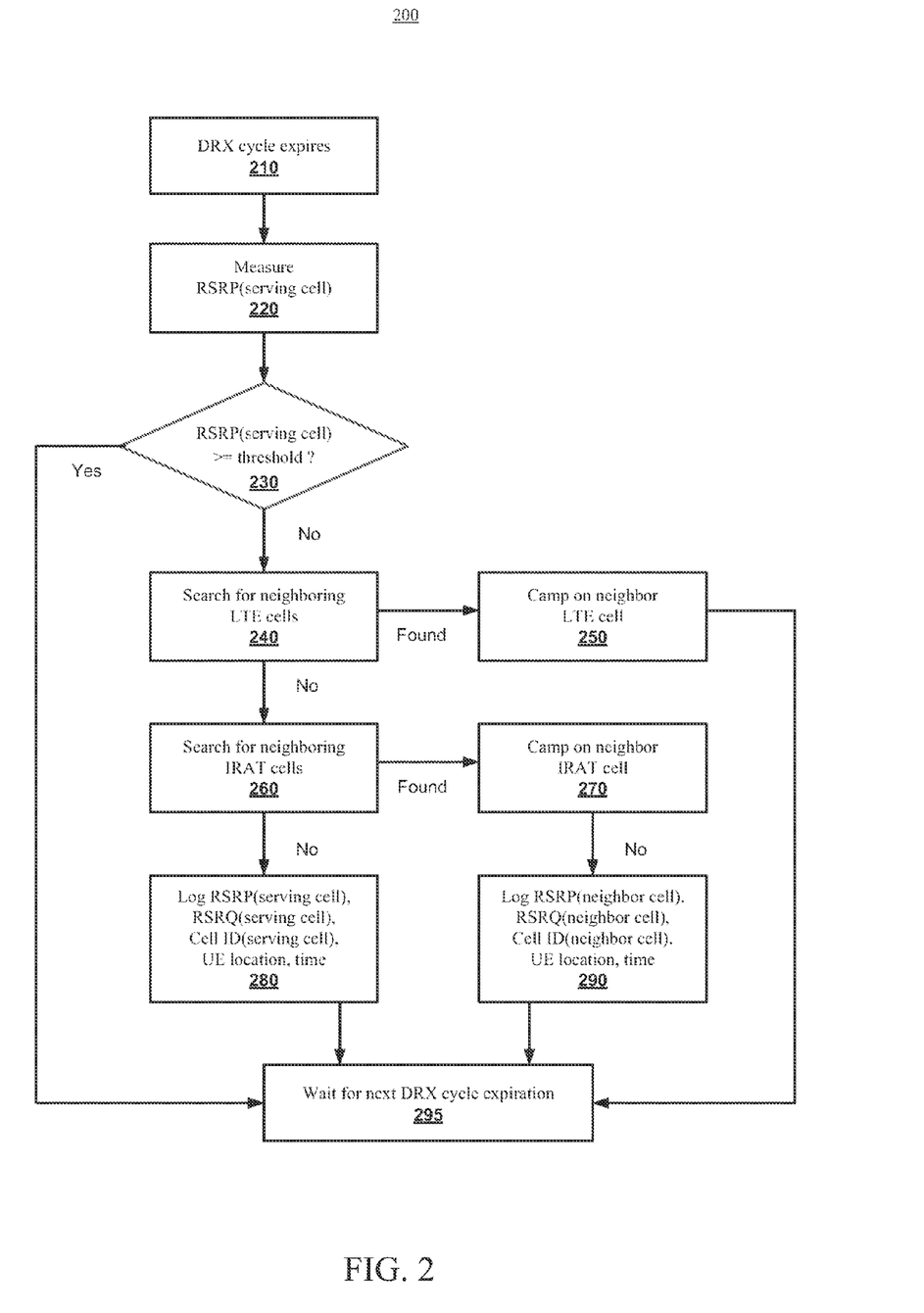
FIG. 2 illustrates a flowchart of operations of an example embodiment consistent with the present disclosure.

FIG. 2 illustrates a flowchart of operations 200 of an example embodiment consistent with the present disclosure.

At operation 210, a discontinuous reception (DRX) cycle, of a UE in idle mode, expires. The UE may be configured with a timer to signal the end of a DRX cycle, at which point the following additional operations may be performed. At operation 220, the reference signal received power (RSRP) of the serving cell of the UE is measured. At operation 230, the RSRP is compared to a threshold. The threshold may be selected to indicate a signal level, above which the serving cell signal strength is acceptable, and cell reselection may not be required. If the RSRP exceeds the threshold, the UE waits for the next DRX cycle expiration, at operation 295.

Otherwise, at operation 240, a search for neighboring LTE cells is performed. If a neighbor LTE cell is found, then at operation 250, the UE camps on that LTE cell. Otherwise, at operation 260, a search for neighboring inter-RAT (IRAT) cells is performed. If a neighbor IRAT cell is found, then at operation 270, the UE camps on that IRAT cell. If neither a neighbor LTE cell nor a neighbor IRAT cell is found, then at operation 280, a log is made of the RSRP, the reference signal received quality (RSRQ) and the cell ID of the serving cell. The UE location and a timestamp are also logged. If a neighbor LTE cell or a neighbor IRAT cell is found, then at operation 290, a log is made of the RSRP, the RSRQ and the cell ID of the neighbor cell. The UE location and a timestamp are also logged. Then, at operation 295, the UE waits for the next DRX cycle expiration.

Figure 3:
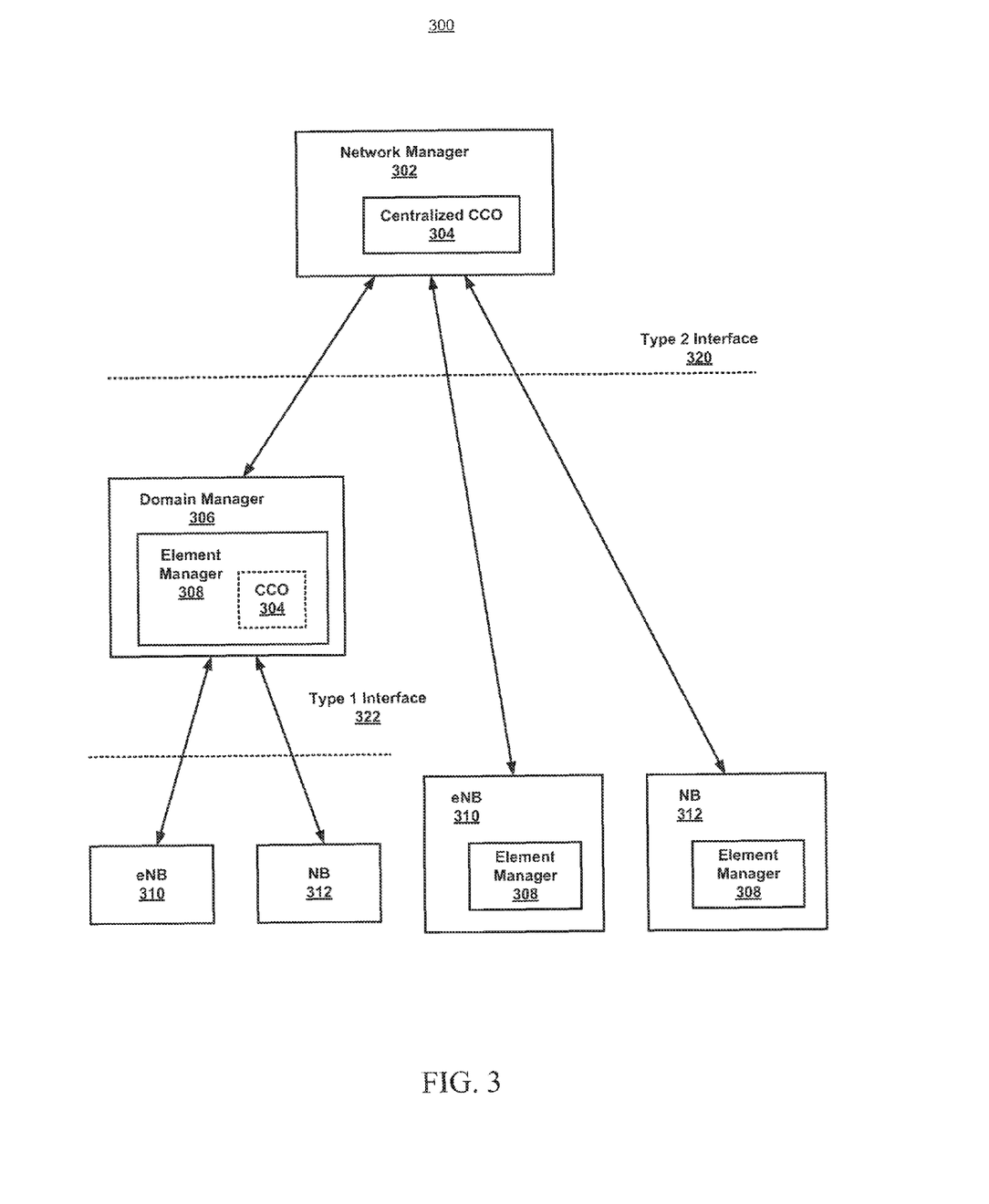
FIG. 3 illustrates a block diagram of one example embodiment consistent with the present disclosure.

FIG. 3 illustrates a block diagram 300 of one example embodiment consistent with the present disclosure. The network manager (NM) 302 is shown to include a centralized capacity and coverage optimization (CCO) module 304, the operation of which will be described in greater detail below. In some embodiments, the CCO 304 may reside in the element manager (EM) 308. The network manager 302 is typically a computer system and/or software application configured to provide and facilitate network support functions to network operators or providers. These support functions may include configuration management, performance monitoring, fault detection and CCO operations. Determining capacity and coverage assists network operators with design, planning and roll out of base stations (e.g., 3GPP LTE eNBs).

The network manager 302 may be configured to communicate with the eNBs 310 (and/or IRAT NBs 312) through a domain manager (DM) 306 which may include an element manager (EM) 308. Domain manager 306 may be configured to provide both element and domain management functions for a sub-network, while element manager 308 may be configured to provide a set of end-user functions for management of a set of related types of network elements, for example 3GPP eNBs 310 and/or IRAT NBs 312. Network manager 302 may also be configured to communicate directly with the eNBs 310 (and/or IRAT NBs 312) through an element manager 308 at the eNB or NB. In embodiments where the CCO 304 resides in the EM 308, the CCO 304 may be configured to detect LTE coverage holes among eNBs that are in the domain of DM 306.

The domain manager 306 may be configured to provide a type 2 interface 320 to the network manager 302, which may be a standardized interface, while providing a type 1 interface 322 to the eNBs 310 (and/or IRAT NBs 312), which may be a proprietary interface. Network manager 302 may be configured to communicate directly with element managers 308 of eNBs 310 (and/or IRAT NBs 312) via type 2 interface 320. Any message translation that may be required between these two types of interfaces may be performed by the domain manager 306 and/or the element managers 308.

Figure 4:
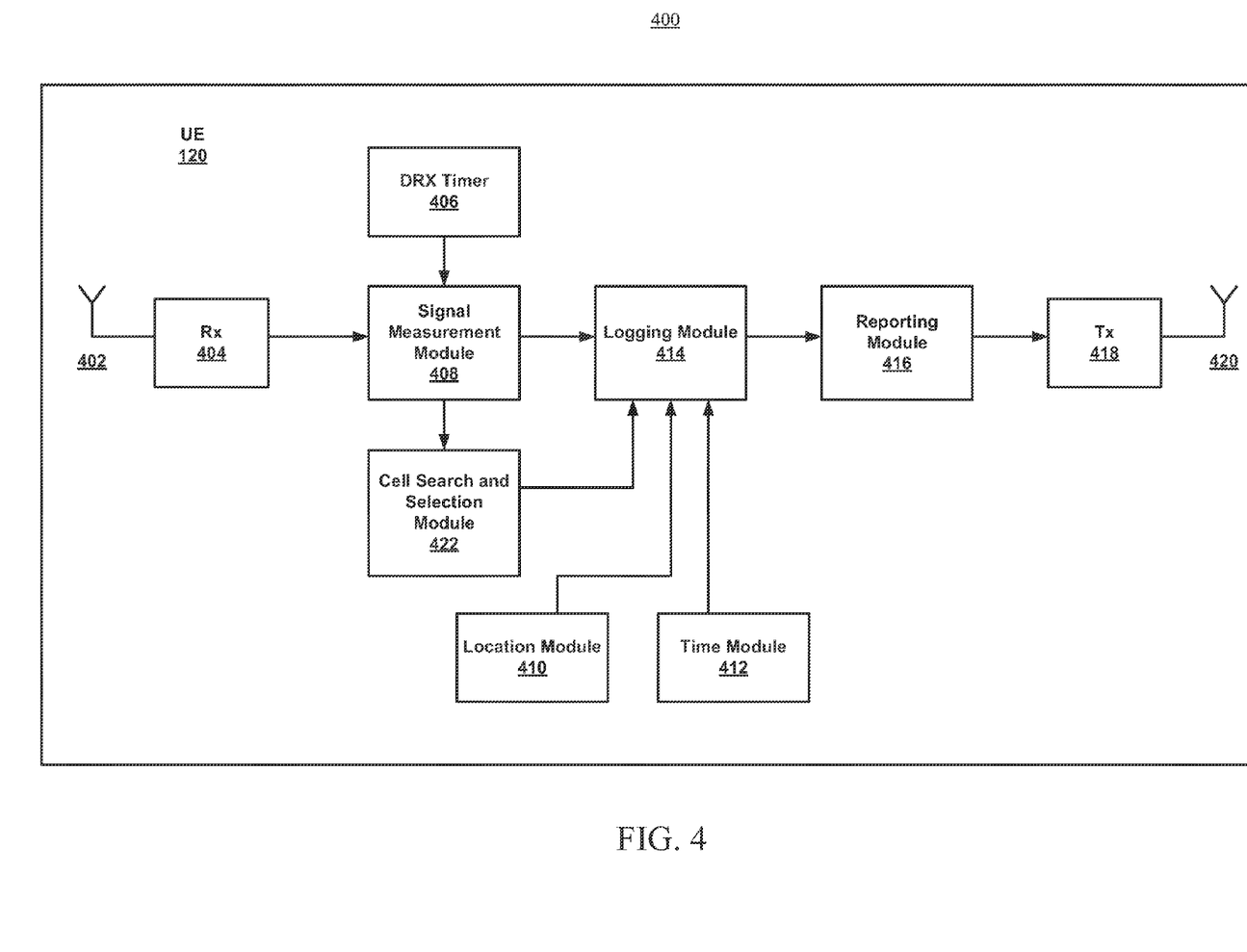
FIG. 4 illustrates a block diagram of another example embodiment consistent with the present disclosure.

FIG. 4 illustrates a block diagram 400 of another example embodiment consistent with the present disclosure. The UE 120 is shown to include a receiver 404 (and associated antenna 402), a signal measurement module 408, a DRX timer 406, a cell search and selection module 422, a logging module 414, a UE location determination module 410, a time module 412, a reporting module 416 and a transmitter 418 (and associated antenna 420). In some embodiments, antennas 402 and 420 may be a common or shared antenna.

Receiver 404 (and associated antenna 402) may be configured to receive signals from an eNB or NB which may be associated with a serving cell of the UE or a neighbor cell. DRX timer may be configured to indicate the end of a DRX cycle time interval for the UE, in idle mode, and to trigger a signal measurement by module 408. Signal measurement module 408 may be configured to measure an RSRP of the serving cell of the UE and to compare the RSRP to a threshold value. The threshold value may be selected to indicate that the serving cell signal strength is acceptable, and that cell reselection may not be required. Cell search and selection module 422 may be configured to search for a neighbor cell in response to determining that the RSRP is below the threshold value, and to cause the UE to camp on that neighbor cell if the search succeeds. Cell search and selection module 422 may be configured to first search for an LTE neighbor cell. If an LTE neighbor cell cannot be found, the search may continue for an inter-RAT cell (e.g., a UMTS cell or a GSM cell).

Location module 410 may be configured to generate or estimate the location of the UE. Time module 412 may be configured to determine time, for example time of day, for use as a timestamp to be associated with measurements by the UE. Logging module 414 may be configured to log information associated with the neighbor cell, if the neighbor cell search (performed by module 422) succeeds or to log information associated with the serving cell, if the neighbor cell search fails. The logged information may include RSRP, RSRQ and cell ID of the neighbor or serving cell depending on success or failure, respectively, of the search. The logged information may further include the UE location and timestamp.

Reporting module 416 may be configured to report the logged information to a capacity and coverage optimization module of a network manager. When the idle mode UE is reconnected to a base station (e.g., an eNB or NB), the UE may transmit the report, through transmitter 418 (and associated antenna 420), to the base station for relay to the NM or EM.

Figure 5:
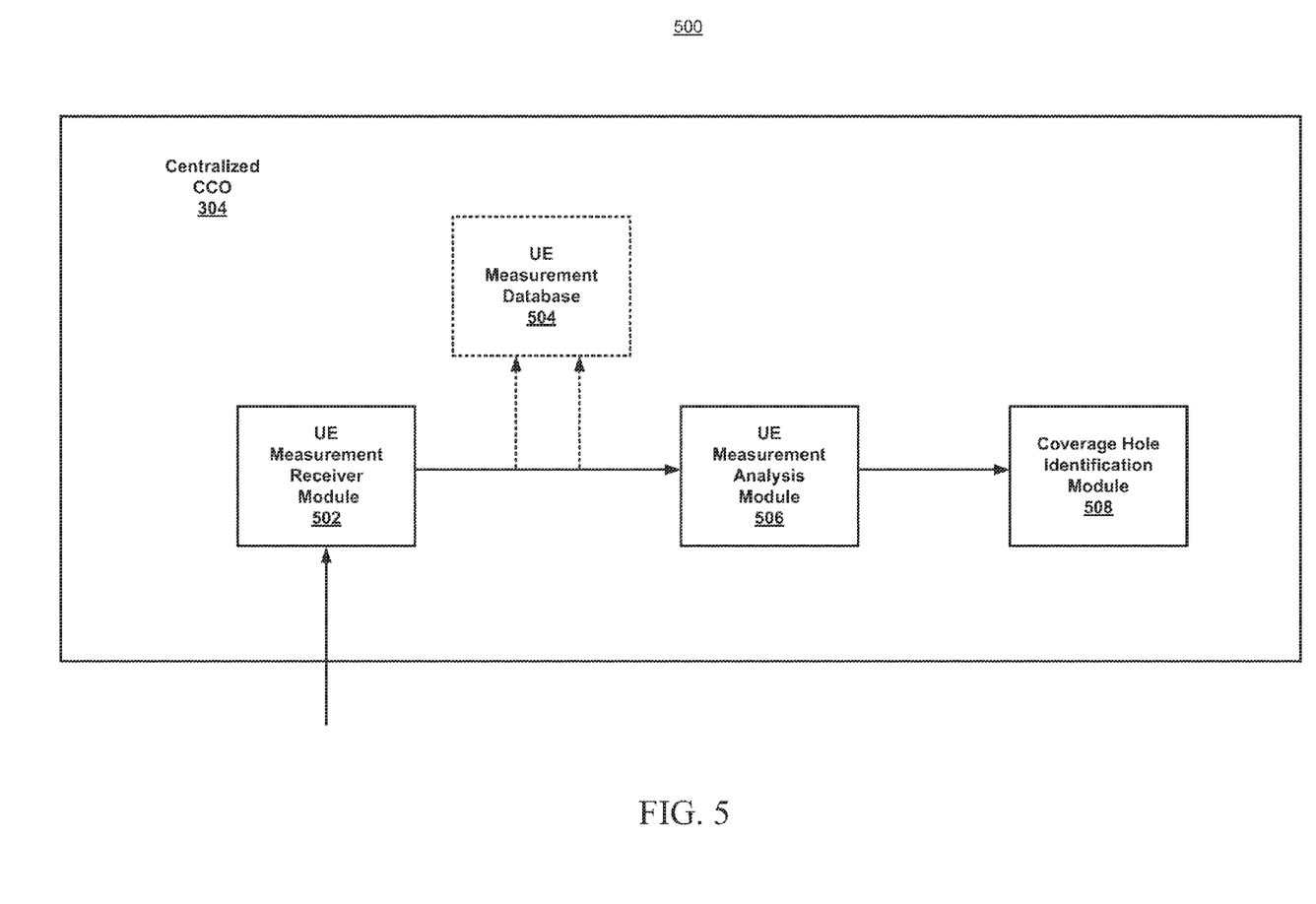
FIG. 5 illustrates a block diagram of another example embodiment consistent with the present disclosure.

FIG. 5 illustrates a block diagram 500 of another example embodiment consistent with the present disclosure. The centralized CCO 304 of network manager 302 is shown to include a UE measurement receiver module 502, a UE measurement analysis module 506 and a coverage hole identification module 508. In some embodiments, the CCO 304 may also include a UE measurement database 504. The UE measurement receiver module 502 may be configured to receive measurements from one or more UEs that are in an idle mode state. The measurements may be transmitted from the UE through an eNB or NB. In some embodiments, the measurements may be further transmitted through a domain manager. The measurements are associated with a cell and may include an ID of that cell, along with an RSRP and an RSRQ. The measurements may also include a location of the UE location and a timestamp.

The UE measurement analysis module 506 may be configured to correlate the received UE measurements based on the UE locations and any other suitable information. The coverage hole identification module 508 may be configured to identify and locate holes in spatial coverage of the LTE wireless cellular network based on the analysis and correlations. In some embodiments, the CCO 304 may further include a UE measurement database 504 configured to store the received UE measurements over a time interval associated with the UE measurement analysis or for any suitable historical period of interest.

Figure 6:
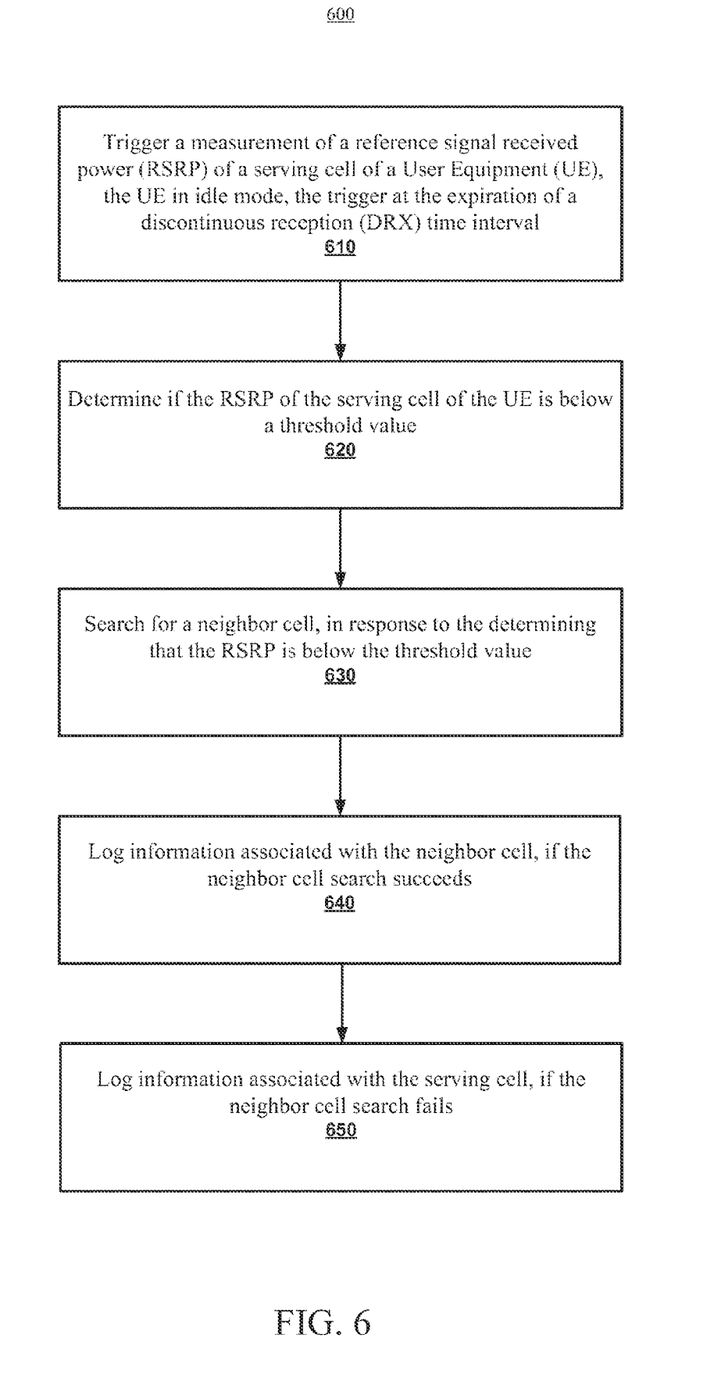
FIG. 6 illustrates a flowchart of operations of another example embodiment consistent with the present disclosure.

FIG. 6 illustrates a flowchart of operations 600 of an example embodiment consistent with the present disclosure. At operation 610, a measurement of a reference signal received power (RSRP) of a serving cell of a User Equipment (UE) is triggered. The UE is in idle mode and the trigger is associated with the expiration of a discontinuous reception (DRX) time interval. At operation 620, it is determined if the RSRP of the serving cell of the UE is below a threshold value. At operation 630, a search for a neighbor cell is performed, in response to the determining that the RSRP is below the threshold value. At operation 640, information associated with the neighbor cell is logged, if the neighbor cell search succeeds. At operation 650, information associated with the serving cell is logged, if the neighbor cell search fails.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all sub-combinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hardwired circuitry, programmable circuitry, state machine circuitry, and/or firmware that stores instructions executed by programmable circuitry. An app may be embodied as code or instructions which may be executed on programmable circuitry such as a host processor or other programmable circuitry. A module, as used in any embodiment herein, may be embodied as circuitry. The circuitry may be embodied as an integrated circuit, such as an integrated circuit chip.

Thus, the present disclosure provides devices, methods, systems and computer-readable storage medium for improved coverage estimation of wireless cellular networks, for example LTE networks, through User Equipment (UE) idle mode measurement and reporting. The following examples pertain to further embodiments.

The UE may include a signal measurement module to measure a reference signal received power (RSRP) of a serving cell of the UE, the UE in an idle mode, and to determine if the RSRP is below a threshold value. The UE of this example may also include a cell search and selection module to search for a neighbor cell in response to determining that the RSRP is below the threshold value, and to camp on the neighbor cell if the search succeeds. The UE of this example may further include a data logging module to log information associated with the neighbor cell, if the neighbor cell search succeeds and to log information associated with the serving cell, if the neighbor cell search fails.

Another example UE includes the forgoing components and further includes a discontinuous reception (DRX) timer to trigger the signal measurement module to perform the RSRP measurement, the trigger at the expiration of a DRX time interval.

Another example UE includes the forgoing components and further includes a location module to provide a location of the UE, the location included in the log information and a time module to provide a timestamp, the timestamp included in the log information.

Another example UE includes the forgoing components and the log information includes RSRP, reference signal received quality (RSRQ) and a cell identification.

Another example UE includes the forgoing components and the cell search and selection module is further configured to search for a neighbor long term evolution (LTE) cell; and search for a neighbor inter-radio access technology (IRAT) cell, if the search for a neighbor LTE cell fails.

Another example UE includes the forgoing components and the IRAT cell includes a Universal Mobile Telecommunication System (UMTS) cell or a Global System for Mobile Communication (GSM) cell.

Another example UE includes the forgoing components and further includes a reporting module to report the log information, to a capacity and coverage optimization (CCO) module of a network manager (NM) or an element manager (EM), the reporting through an evolved Node B (eNB) in response to the UE reconnecting to the eNB.

According to another aspect there is provided a method. The method may include triggering a measurement of a reference signal received power (RSRP) of a serving cell of a User Equipment (UE), the UE in idle mode, the trigger at the expiration of a discontinuous reception (DRX) time interval. The method of this example may also include determining if the RSRP of the serving cell of the UE is below a threshold value. The method of this example may further include searching for a neighbor cell, in response to the determining that the RSRP is below the threshold value. The method of this example may further include logging information associated with the neighbor cell, if the neighbor cell search succeeds. The method of this example may further include logging information associated with the serving cell, if the neighbor cell search fails.

Another example method includes the forgoing operations and the log information includes RSRP, reference signal received quality (RSRQ), a cell identification, a location of the UE and a timestamp.

Another example method includes the forgoing operations and the searching for a neighbor cell further includes: searching for a neighbor long term evolution (LTE) cell; and searching for a neighbor inter-radio access technology (IRAT) cell, if the search for a neighbor LTE cell fails.

Another example method includes the forgoing operations and the IRAT cell includes a Universal Mobile Telecommunication System (UMTS) cell or a Global System for Mobile Communication (GSM) cell.

Another example method includes the forgoing operations and further includes reporting the log information, to a capacity and coverage optimization (CCO) module of a network manager (NM) or an element manager (EM), the reporting through an evolved Node B (eNB) in response to the UE reconnecting to the eNB.

Another example method includes the forgoing operations and further includes remaining in idle mode and waiting for a subsequent trigger, after the logging.

Another example method includes the forgoing operations and further includes camping on the neighbor cell, if the neighbor cell search succeeds.

According to another aspect there is provided a system. The system may include a User Equipment (UE) measurement receiver module to receive measurements from a plurality of UEs in an idle mode state, the measurements associated with a cell and including an ID of the cell, a reference signal received power (RSRP), a reference signal received quality (RSRQ), a location of the UE location and a timestamp. The system of this example may also include a UE measurement analysis module to correlate the received UE measurements based on the UE locations. The system of this example may further include a coverage hole identification module to identify and locate holes in spatial coverage of a long term evolution (LTE) wireless cellular network based on the correlations.

Another example system includes the forgoing components and further includes a UE measurement database to store the received UE measurements over a time interval associated with the UE measurement analysis.

Another example system includes the forgoing components and the received UE measurements are provided through an evolved Node B (eNB).

Another example system includes the forgoing components and the received UE measurements are provided through a domain manager.

According to another aspect there is provided a system. The system may include a means for triggering a measurement of a reference signal received power (RSRP) of a serving cell of a User Equipment (UE), the UE in idle mode, the trigger at the expiration of a discontinuous reception (DRX) time interval. The system of this example may also include a means for determining if the RSRP of the serving cell of the UE is below a threshold value. The system of this example may further include a
means for searching for a neighbor cell, in response to the determining that the RSRP is below the threshold value. The system of this example may further include a means for logging information associated with the neighbor cell, if the neighbor cell search succeeds. The system of this example may further include a means for logging information associated with the serving cell, if the neighbor cell search fails.

Another example system includes the forgoing components and the log information includes RSRP, reference signal received quality (RSRQ), a cell identification, a location of the UE and a timestamp.

Another example system includes the forgoing components and further includes a means for searching for a neighbor long term evolution (LTE) cell; and a means for searching for a neighbor inter-radio access technology (IRAT) cell, if the search for a neighbor LTE cell fails.

Another example system includes the forgoing components and the IRAT cell includes a Universal Mobile Telecommunication System (UMTS) cell or a Global System for Mobile Communication (GSM) cell.

Another example system includes the forgoing components and further includes a means for reporting the log information, to a capacity and coverage optimization (CCO) module of a network manager (NM) or an element manager (EM), the reporting through an evolved Node B (eNB) in response to the UE reconnecting to the eNB.

Another example system includes the forgoing components and further includes a means for remaining in idle mode and waiting for a subsequent trigger, after the logging.

Another example system includes the forgoing components and further includes a means for camping on the neighbor cell, if the neighbor cell search succeeds.

According to another aspect there is provided at least one computer-readable storage medium having instructions stored thereon which when executed by a processor, cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A User Equipment (UE) for communicating on a wireless network, comprising:
   a processor and a memory, the memory comprising instructions which when executed by said processor cause said UE to log a reference signal received power (RSRP) and a reference signal received quality (RSRQ) of a serving cell of a UE in an idle mode based on a discontinuous reception timer; and
   a transmitter to report said RSRP and said RSRQ to a coverage and capacity optimization (CCO) circuitry in a network manager or a domain manager;
   wherein said instructions when executed by said processor further cause said UE to search for a neighbor long term evolution (LTE) cell when said RSRP and said RSRQ is below a threshold value, and to camp on said neighbor LTE cell when said search for a neighbor LTE cell succeeds.

2. The UE of claim 1, wherein the transmitter is further configured to report one or more of a time stamp, location information of said UE and a cell ID of said cell.

3. The UE of claim 1, wherein said UE further comprises measuring circuitry to measure said RSRP and said RSRQ.

4. The UE of claim 3, wherein said instructions when executed by said processor further cause said UE to determine if said RSRP and said RSRQ is below said threshold value.

5. The UE of claim 1, wherein said instructions when executed by said processor further cause said UE to search for a neighbor inter-radio access technology (IRAT) cell when said search for a neighbor LTE cell fails.

6. The UE of claim 1, further comprising:
a receiver to receive one or more signals from an evolved Node B (eNB) associated with the serving cell of said UE.

7. A method for estimating coverage of a wireless network, comprising:
logging a reference signal received power (RSRP) and a reference signal received quality (RSRQ) of a serving cell for a UE in an idle mode at the end of a discontinuous reception (DRX) cycle;
reporting said RSRP and said RSRQ to a coverage and capacity optimization (CCO) module in a network manager or a domain manager;
searching for a neighbor long term evolution (LTE) cell when said RSRP and said RSRQ is below a threshold value, and
camping on said neighbor LTE cell when said search for the neighbor LTE cell succeeds.

8. The method of claim 7, further comprising:
reporting at least one of a time stamp, location information of said UE and a cell ID of said serving cell.

9. The method of claim 7, further comprising:
measuring said RSRP and said RSRQ;
determining whether said RSRP and RSRQ are below said threshold value.

10. The method of claim 7, further comprising:
searching for a neighbor inter-radio access technology (IRAT) cell when said search for the neighbor LTE cell fails.

11. The method of claim 10, wherein said IRAT cell comprises a Universal Mobile Telecommunication System (UMTS) cell or a Global System for Mobile Communication (GSM) cell.

12. The method of claim 7, wherein said reporting comprises reporting said RSRP and said RSRQ to said CCO module via an evolved Node B (eNB).

13. A non-transitory computer-readable storage medium having instructions stored thereon which when executed by a processor, result in the performance of the following operations for a user equipment (UE) for communicating on a wireless network, said operations comprising:
logging a reference signal received power (RSRP) and a reference signal received quality (RSRQ) of a serving cell for a UE in an idle mode at an end of a discontinuous reception (DRX) cycle; and
reporting said RSRP and said RSRQ to a coverage and capacity optimization (CCO) module in a network manager or a domain manager;
searching for a neighbor long term evolution (LTE) cell when said RSRP and said RSRQ is below a threshold value, and
camping on said neighbor LTE cell when said search for the neighbor LTE cell succeeds.

14. The non-transitory computer-readable storage medium of claim 13, wherein said instructions when executed further cause performance of the following operations comprising:
reporting at least one of a time stamp, location information of said UE and a cell ID of said serving cell.

15. The non-transitory computer-readable storage medium of claim 13, wherein said instructions when executed by said processor further cause performance of the following operations comprising:
measuring said RSRP and said RSRQ;
determining whether said RSRP and RSRQ are below said threshold value.

16. The non-transitory computer-readable storage medium of claim 13, wherein said instruction when executed by said processor further cause performance of the following operations comprising:
searching for a neighbor inter-radio access technology (IRAT) cell when said search for the neighbor LTE cell fails.

17. The non-transitory computer-readable storage medium of claim 16, wherein said IRAT cell comprises a Universal Mobile Telecommunication System (UMTS) cell or a Global System for Mobile Communication (GSM) cell.

18. The non-transitory computer-readable storage medium of claim 13, wherein said reporting comprises reporting said RSRP and said RSRQ to said CCO module via an evolved Node B (eNB).

19. A User Equipment (UE) for communicating on a wireless network, comprising:
a logging module to log a reference signal received power (RSRP) and a reference signal received quality (RSRQ) of a serving cell for a UE in an idle mode; and
a transmitter to report said RSRP and said RSRQ to a coverage and capacity optimization (CCO) module in a network manager or a domain manager;
a cell search and selection module to search for a neighbor long term evolution (LTE) cell when said RSRP and said RSRQ is below a threshold value, and to camp on said neighbor LTE cell when said search for a neighbor LTE cell succeeds.

20. The UE of claim 19, further comprising:
a measuring module to determine if said RSRP and said RSRQ is below said threshold value.

21. The UE of claim 19, wherein said cell search and selection module is further to search for a neighbor inter-radio access technology (IRAT) cell when said search for a neighbor LTE cell fails.

* * * * *